United States Patent [19]
Bishop et al.

[11] Patent Number: 6,011,240
[45] Date of Patent: Jan. 4, 2000

[54] METHOD AND APPARATUS FOR BUTT WELDING TOGETHER SHEET BLANKS

[75] Inventors: Bob Bishop, Newmarket; Ludvik Lecek, Pickering, both of Canada

[73] Assignee: Automated Welding Systems Inc., Markham, Canada

[21] Appl. No.: 09/091,287

[22] PCT Filed: Nov. 6, 1996

[86] PCT No.: PCT/CA96/00737

§ 371 Date: Jun. 16, 1998

§ 102(e) Date: Jun. 16, 1998

[87] PCT Pub. No.: WO97/26110

PCT Pub. Date: Jul. 24, 1997

[30] Foreign Application Priority Data

Jan. 12, 1996 [CA] Canada ................................. 2167111

[51] Int. Cl.[7] ................................................ B23K 26/00
[52] U.S. Cl. ................................ 219/121.63; 219/121.64; 219/121.82; 219/121.11; 219/121.31; 219/121.6; 219/121.85
[58] Field of Search .................. 219/121.63, 121.64, 219/121.82, 121.11, 121.31, 121.6, 121.85; 228/49.1, 44.3

[56] References Cited

U.S. PATENT DOCUMENTS

| | | | |
|---|---|---|---|
| 4,223,201 | 9/1980 | Peters et al. .................. | 219/121 LC |
| 4,623,777 | 11/1986 | Aihara et al. .................. | 219/121 L |
| 4,626,651 | 12/1986 | Taniguchi et al. ............. | 219/121 LC |
| 5,023,427 | 6/1991 | Neiheisel et al. .............. | 219/121.82 |
| 5,045,668 | 9/1991 | Neiheisel et al. .............. | 219/121.983 |
| 5,229,571 | 7/1993 | Neiheisel ....................... | 219/121.63 |
| 5,266,770 | 11/1993 | Noe ................................. | 219/121.63 |
| 5,399,834 | 3/1995 | Guth ............................... | 219/121.63 |

*Primary Examiner*—Patrick Ryan
*Assistant Examiner*—M. Alexandra Elve
*Attorney, Agent, or Firm*—Riches, McKenzie & Herbert

[57] ABSTRACT

An apparatus is disclosed for positioning, clamping and welding together proximal edge portions of two sheet blanks. The apparatus incorporates a high energy laser and sheet clamping mechanism used to clamp each sheet blank in place between an associated electromagnet and ferromagnetic clamping shoes. The shoes are positioned above a corresponding electromagnet and are vertically movable there towards on the activation of the electromagnet. In use, the sheets are held in place with the respective sheet blanks sandwiched between the associated electromagnets and shoes with the proximal edge portions of the sheets abutting. The high energy laser is movably provided in the apparatus to move an emitted laser beam along a predetermined path over the abutting proximal edge portions to perform welding operations.

20 Claims, 13 Drawing Sheets

METHOD AND APPARATUS FOR BUTT WELDING TOGETHER SHEET BLANKS

SCOPE OF THE INVENTION

The present invention relates to a method and apparatus for aligning and welding together two or more sheet blanks and, more particularly, to an apparatus adapted to automatically align and butt weld together proximal edge portions of two sheets along a common seam line.

BACKGROUND OF THE INVENTION

Present day manufacturing requirements often necessitate the formation of various workpiece components by welding together two or more metal sheet blanks. Typically, individual sheet blanks are joined by conventional seam or butt welding equipment, such as high energy $CO_2$ lasers, or electric beam/plasma arc-welding devices. To obtain an effective and complete weld, it is necessary to ensure that the proximal edges of the sheets to be joined are positioned and maintained in a directly abutting orientation during the welding operation.

Where $CO_2$ lasers are used to perform welding operations, to ensure the formation of a complete weld seam, it is necessary that the edges of the sheet blanks be pre-finished and have a mirror-smooth finish.

Conventional welding apparatus used to join sheet blanks incorporate mechanical clamps for holding the sheets together. The use of mechanical clamps to secure the sheet blanks during welding, however, leads to inefficiencies in workpiece production. In particular, mechanical clamping mechanisms require increased time to clamp and unclamp the sheet blanks in position prior to and after welding. A further disadvantage of conventional apparatus is that the increased clamping time resulting from the use of mechanical clamps inhibits adjustment in the positioning of the proximal edges of the sheets which are to be welded together once the clamps are engaged.

Mechanical clamps which are used in conventional welding apparatus are typically pneumatically or hydraulically operated, requiring that the welding apparatus include large rigid and expensive clamp supporting frames to absorb the clamping forces.

In one attempt to overcome the disadvantages of prior art welding apparatus, magnetic clamping devices have been proposed, as for example, is disclosed in U.S. Pat. No. 5,023,427 which issued Jun. 11, 1991 to Neiheisel et al. The Neiheisel patent discloses an apparatus for aligning steel sheets which are to be welded together by a laser. In the apparatus of Neiheisel, an electromagnet is used to support the sheets in such a manner as to induce opposite magnetic polarities in the proximal edges of adjacent sheets, drawing the sheets together by creating a magnetic attraction therebetween.

While the apparatus of Neiheisel may be useful in aligning proximal edge portions of iron or other ferromagnetic sheets which are of a thickness sufficient to minimize magnetic reluctance therebetween, the apparatus of Neiheisel is poorly suited for use in aligning thinner steel sheet blanks, or sheet blanks which are plated or coated or which are made from non-ferromagnetic materials such as copper, aluminum, plastic and the like.

SUMMARY OF THE INVENTION

To at least partially overcome the difficulties of prior art welding apparatus, the present invention incorporates a sheet clamping mechanism which clamps sheet blanks in place between an electrically activated magnetic sheet supporting surface, and at least one clamping shoe which is magnetically attracted to the magnet. The shoe is positioned above the magnetic surface and is vertically movable theretowards with the activation of the magnetic surface, whereby the magnetic attraction of the shoe towards the magnetic surface pulls the shoe downwardly. In this manner, part of the sheet blank which is sandwiched between the shoe and magnetic surface is held in place at least in part by the downward force applied by the magnetic attraction of the shoe to the magnetic surface. The electromagnetic clamping mechanism of the present invention advantageously permits almost instant clamping and unclamping of the sheets to be welded by activating and deactivating the electromagnet. Further as clamping is performed by the magnetic attraction of the shoe, the apparatus may be used to weld non-ferromagnetic sheet blanks.

Another object of the invention is to provide an apparatus for accurately and quickly aligning the proximal edge portions of two or more sheets which are to be welded together in a position aligned with the path of a movable welding apparatus.

It is another object of the invention to provide an apparatus adapted to align and secure in an abutting relationship the proximal edge portions of both ferromagnetic sheet blanks and non-ferromagnetic sheet blanks, as for example may be made from iron, steel, copper, aluminum, nickel, metal alloys and/or plastics and the like.

Another object is to provide an apparatus for laser butt welding two or more sheet blanks together, without requiring that the edge portions of the blanks be pre-finished.

A further object of the invention is to provide a simplified apparatus for automatically aligning and welding the proximal edges of sheet blanks to be joined, which may easily be adapted to perform welding operations on different sheet blanks to produce different finished workpieces.

Another object of the invention is to provide an apparatus having a clamping mechanism for clamping together edge portions of workpiece blanks, and which does not require a large or cumbersome supporting frame to offset and absorb clamping forces.

Another object of the invention is to provide an apparatus for positioning and welding together proximal edge portions of two or more sheet blanks having different relative thicknesses.

To achieve at least some of the foregoing objects, the present invention includes a laser or other welding apparatus for welding together proximal edge portions of two sheet blanks, and two clamping mechanisms, each supporting thereon an associated respective one of the sheet blanks to be joined in a desired orientation relative to the other. Preferably, a high energy laser, such as a yttrium aluminum garnet (YAG) laser, is used to weld the blanks. The laser is movably provided in the apparatus so as to move an emitted laser beam relative to the sheet blanks along a sensed or predetermined linear and/or curved path. In this manner, the laser is activated and moved along its sensed/predetermined path to weld proximal edges of the two sheet blanks together along a seam line aligned with the path of the laser beam.

At least one clamping mechanism includes an electrically activated magnetic supporting surface which supports a lower side of the associated sheet blank thereon, and one or more vertically movable clamping shoes spaced above the magnetic supporting surface. The magnetic surface is preferably part of an electromagnet operated by electric current.

The electromagnet may comprise of one or more conventional electromagnets, but more preferably consists of one or a series of electronically switchable permanent magnets which are arranged in an array and contain electric coils, and which are electrically pulsed to provide increased downward magnetic forces.

The clamping shoes are made from a ferromagnetic material such as iron, or is otherwise constructed having a high magnetic susceptibility so as to be magnetically attracted and held down by the electromagnetic support when the support is activated. By lowering the shoes of each clamping mechanism onto the top of the sheet blank so it is sandwiched between the support and shoes, the proximal portions of the sheets are clamped in position. Clamping is achieved by both the downward force applied by the shoe as a result of its magnetic attraction to the corresponding electromagnetic support as well as by any magnetic attraction of the sheet blank to the support.

The electromagnetic support may be provided as an elongated electromagnet which extends longitudinally along and supports the underside of a respective sheet, adjacent the proximal edge to be joined. The shoe may also be formed as a single elongate member which extends longitudinally above the electromagnetic support, or for ease of manufacture a number of smaller, longitudinally spaced shoes are provided at spaced locations thereabove.

The shoes are mounted to the apparatus, so as to be reciprocally movable between a raised position spaced slightly above the upper surface of the sheet, and a lowered clamping position. In the clamping position, the shoe is moved downwardly into engagement with the upper surface of the sheet, clamping it against movement between the shoe and the respective supporting electromagnet.

A positioning guide may also be provided to ensure correct location of the sheet blanks. The guide acts to locate the edge proximal portion of one of the sheet blanks in a position aligned with the predetermined seam line. When the proximal edge of the second other sheet is moved against the other sheet, the proximal edge portions of both sheets thus both orient in an abutting relationship aligned with the predetermined seam line.

Accordingly in one aspect the present invention resides in an apparatus for aligning and welding together proximal edge portions of first and second sheets, said apparatus including, welding means for welding the proximal edge portion of the first sheet to the proximal edge portion of the second sheet along a seam line, positioning means for positioning the proximal edge portion of said first sheet in a welding position substantially aligned with said seam line, first sheet supporting means for supporting said first sheet with said edge portion of said first sheet in said welding position, the first sheet supporting means including, first clamping means for releasably retaining said first sheet in said apparatus during welding, the first clamping means comprising, first magnetic hold-down means for engagingly supporting a first side of said first sheet, and first shoe means for engaging the second other side of said first sheet, the first shoe means characterized by magnetic susceptibility and being movable relative to said first hold-down means between a forward position wherein said first shoe means is moved towards said first hold-down means a distance selected to substantially prevent movement of said first sheet therebetween and a rearward position wherein said first shoe means is moved away from said first hold-down means to permit substantially unhindered movement of said first sheet therebetween, the first clamping means being activatable to produce a magnetic field in the first hold-down means sufficient to magnetically attract the first shoe means to the forward position and clamp the first sheet therebetween, and second sheet supporting means for supporting said second sheet with said proximal edge portion of said second sheet in a generally abutting relationship with said proximal edge portion of said first sheet.

In a further aspect the present invention resides in an apparatus for forming a workpiece by welding together proximal edge portions of first and second sheet blanks, said apparatus including, welding means for welding the proximal edge portion of the first sheet to the proximal edge portion of the second sheet along a seam line, positioning means for maintaining the edge portion of said first sheet in a position substantially aligned with said seam line, first sheet supporting means for supporting said first sheet in a generally horizontal position thereon with said edge portion of said first sheet in said position aligned with said seam line, the first sheet supporting means including, first clamping means for releasably retaining said first sheet in said apparatus during welding the first clamping means comprising, first magnetic hold-down means for engagingly supporting a first lower side of said first sheet, and first shoe means for engaging the other upper side of said first sheet, the first shoe means characterized by magnetic susceptibility movable relative to the first hold-down means between a sheet engaging position, wherein the first shoe means is lowered towards the first hold-down means to engage and clamp the first sheet in position between the first shoe means and first hold-down means, and a release position wherein the first shoe means is raised above the first hold-down means a distance selected to permit movement of the first sheet therebetween, wherein the clamping means is activatable to produce a magnetic field in the first hold-down means to magnetically attract the first shoe means and assist in moving the first shoe means to the sheet engaging position, second sheet supporting means for supporting said second sheet thereon in a substantially horizontal orientation with said edge portion of said second sheet in an approximately abutting relationship with said edge portion of said first sheet.

In another aspect the present invention resides in a use of an apparatus to form a workpiece by welding together proximal edge portions of first and second sheet blanks, said apparatus including, welding means for welding the proximal edge portion of the first sheet to the proximal edge portion of the second sheet along a predetermined or sensed seam line, positioning means for positioning the edge portion of said first sheet in a position substantially aligned with said seam line, first sheet supporting means for supporting said first sheet with said edge portion of said first sheet in said position aligned with said seam line, the first sheet supporting means including, first clamping means activatably to releasably retain said first sheet in said apparatus during welding, the first clamping comprising, first electromagnetic hold-down means for engagingly supporting a first side of said first sheet, and first shoe means for engaging the second other side of said first sheet, the first shoe means characterized by magnetic susceptibility and being movable relative to said first hold-down mans between a forward clamping position wherein said first shoe means is moved towards said first hold-down means to engage and clamp a portion of said first sheet therebetween, and a rearward position wherein said first shoe means is moved away from said first hold-down means a distance sufficient to permit movement of said first sheet therebetween, and second sheet supporting means for supporting said second sheet thereon with said edge portion of said second sheet in an approximately abutting relationship with said edge portion of said first sheet, said second sheet supporting means including, second clamping means activatable to releasably retain said second sheet in said apparatus during welding, the second clamping means comprising, second electromagnetic hold-down means for engagingly supporting a first side of said second sheet, and second shoe means for engaging the second other side of said second sheet, the second shoe means characterized by magnetic susceptibility and being movable relative to said second hold-down means between a forward clamping position, wherein said second shoe means is moved towards said second hold-down means to engage and clamp a portion of said second sheet therebetween, and a rearward position wherein said second shoe means is moved away from said second hold-down means a distance sufficient to permit movement of said second sheet therebetween, wherein with each of said first and second means positioned in said respective rearward positions, said workpiece is formed by the steps of moving said first sheet between said first shoe means and said first hold-down means to engage said positioning means and to position said edge portion of said first sheet substantially in alignment with said seam line, activating said first clamping means to product a magnetic field in said first hold-down means and move the first show means to the forward position to retain the first sheet therebetween, moving said second sheet between said first shoe means and said second hold-down means to position the edge portion of the second sheet in a position abutting the edge portion of the first sheet, activating the second clamping means to produce a magnetic field in said second hold-down means and move the second shoe means to the forward position to retain the second sheet therebetween, and activating said welding means to perform welding along the seam line to weld together the edge portion of the first sheet and the edge portion of the second sheet.

BRIEF DESCRIPTION OF THE DRAWINGS

Further objects and advantages of the invention will appear from the following description taken together with the accompanying drawings in which.

DETAILED DESCRIPTION OF THE INVENTION

Figure 1:
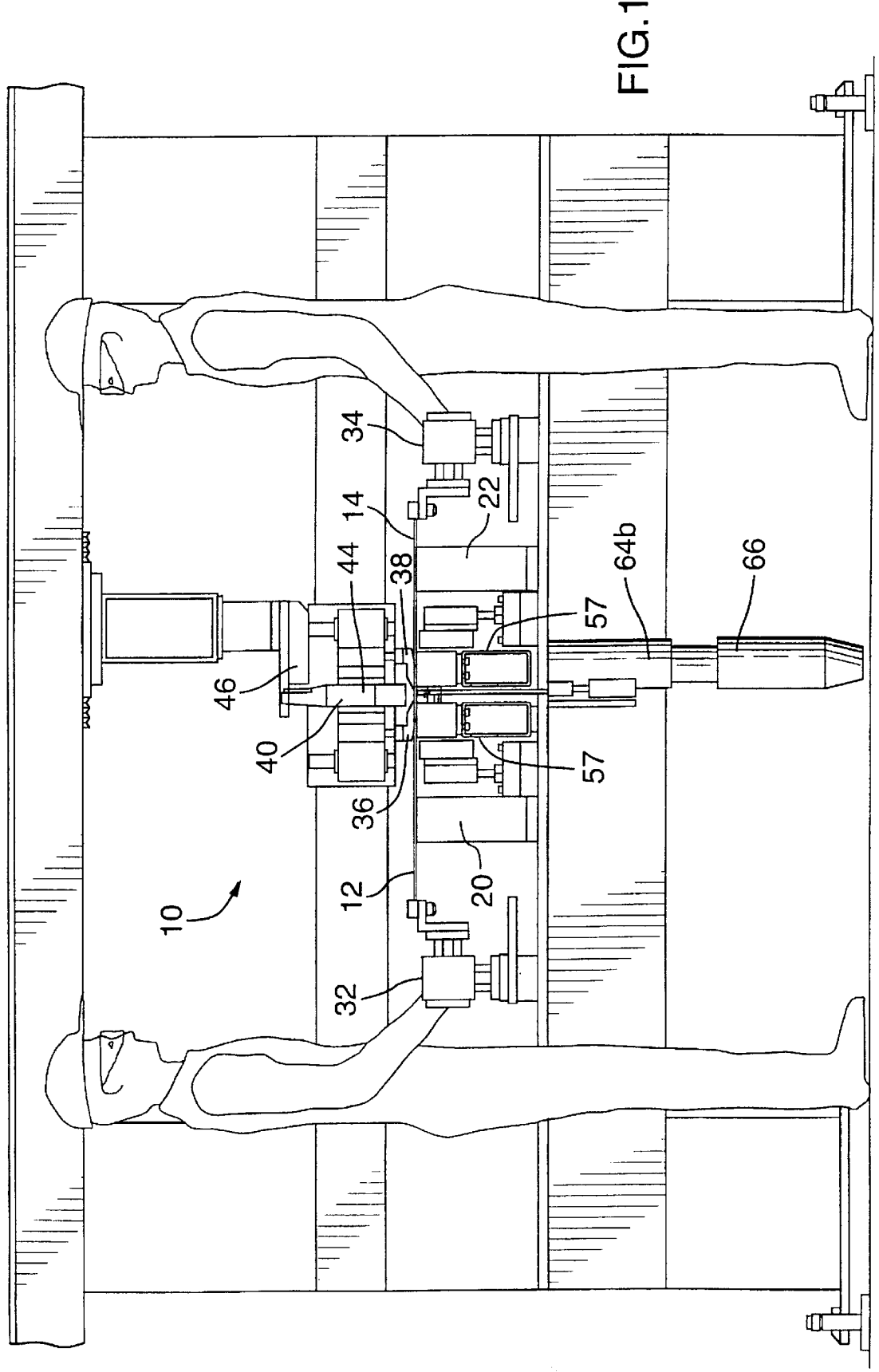
FIG. 1 is a cross-sectional end view of a welding apparatus in accordance with a first preferred embodiment of the invention.

Reference is made to FIG. 1 which shows an apparatus 10 for aligning and welding together two planar steel sheets 12,14. The apparatus 10 joins the sheets 12,14 together along a longitudinally extending and predetermined linear seam line 16 which is aligned with the longitudinal axis $A_1$ of the apparatus 10, to form a finished composite workpiece 18 (shown best in FIG. 2). As will be described hereafter, the apparatus 10 joins the sheets 12,14 by welding their respective proximal or facing edge portions 12',14' together. It is to be appreciated that the sheets 12,14 are formed having generally linear proximal edge portions 12',14' which are complementary to each other so as to properly meet along the desired seam line 16, with each edge portion 12',14' to be joined extending generally in the direction of axis $A_1$.

To move the sheet blanks 12,14 into the apparatus 10 for welding, the apparatus 10 is provided with two magnetic stepping conveyors 20,22 which extend longitudinally along each side of the axis $A_1$. A sheet positioning assembly which includes three cylindrical weld datum or locating pins 30 (shown best in FIGS. 4 to 7) and a number of spaced pneumatically operated positioning slide assemblies or rods 32,34 is used for the final alignment of the blanks 12,14 prior to welding. As will be described in detail hereafter, two independently operable sheet clamping units 36,38 secure a respective sheet 12,14 in position during welding so that the proximal edge portions 12',14' of the sheets 12,14 are maintained in the proper orientation aligned with the predetermined seam line. A Lumonics 2 kW YAG laser is provided for welding the sheets 12,14 together along the predetermined workpiece seam line 16.

Figure 2:
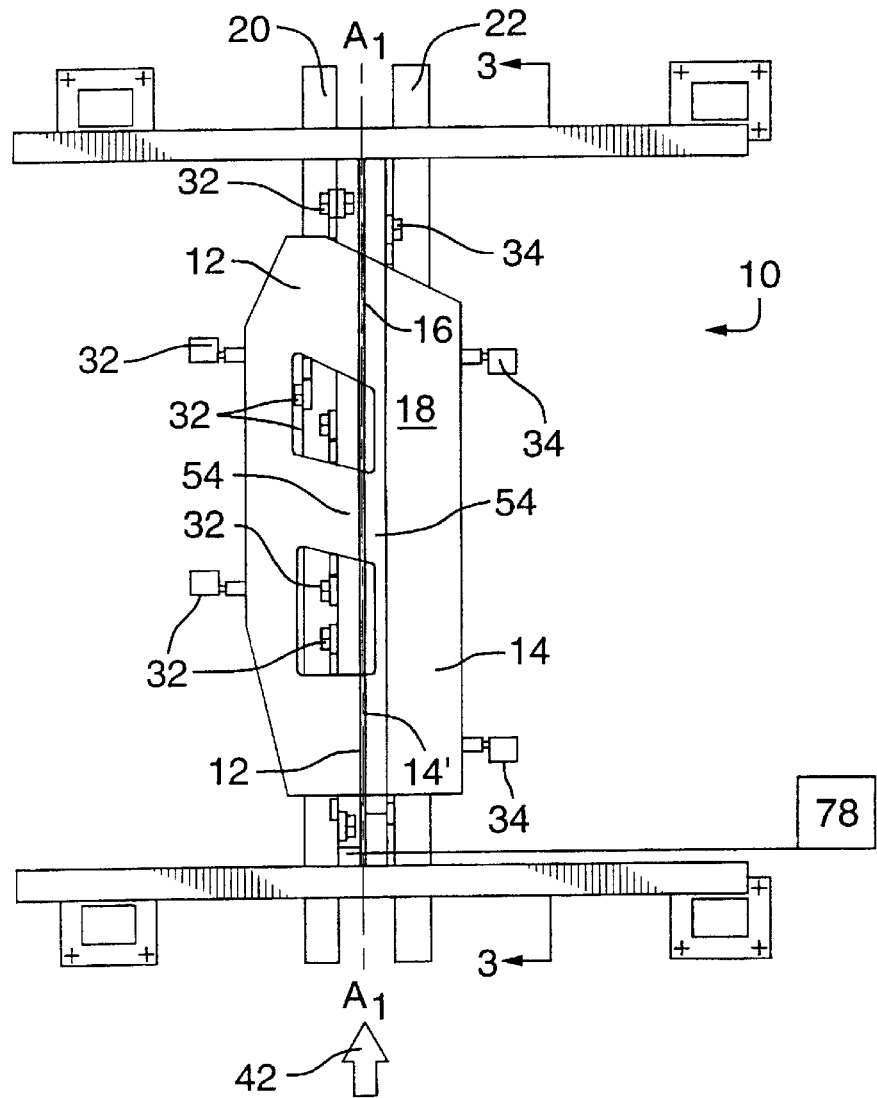
FIG. 2 is a top view of the apparatus of FIG. 1 showing the formation of a workpiece composite blank thereon.

As seen best in FIGS. 1 and 2, the magnetic conveyors 20,22 are provided in a spaced apart arrangement each extending parallel to and on each side of the seam line 16. The conveyors 20,22 are independently operable to move a respective sheet blank 12,14 in the longitudinal direction of arrow 42 (FIG. 2) into the apparatus 10 to a workstation for welding; as well as moving the finished workpiece 18 outwardly therefrom. Although not essential, the use of magnetic conveyors 20,22 in conveying steel or other ferromagnetic sheets advantageously minimizes the likelihood that the sheets 12,14 will move out of alignment or slide off of the conveyors 20,22 as they are moved.

Figure 3:
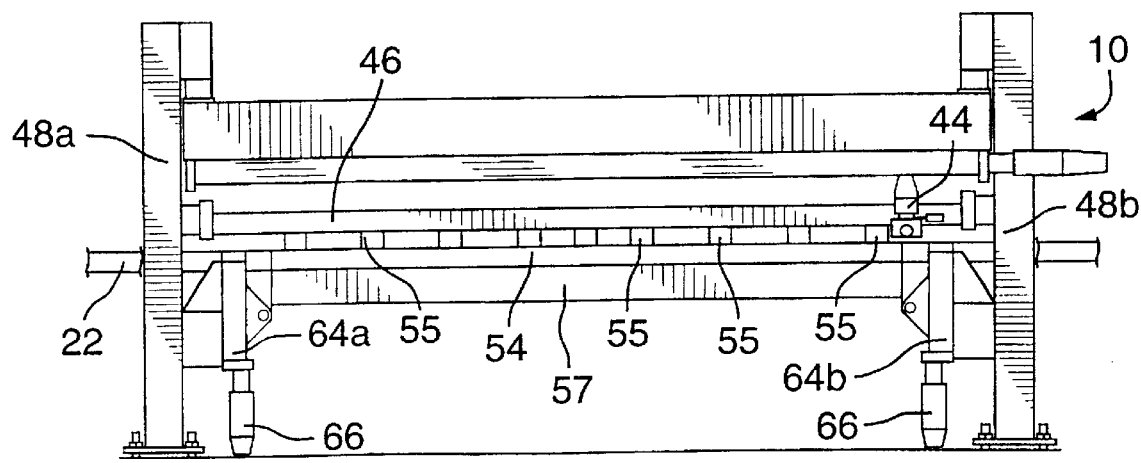
FIG. 3 is a cross-sectional view of the apparatus as shown in FIG. 2 taken along lines 3–3'.

FIGS. 1 and 3 show the YAG laser as including a laser head (hereinafter generally referred to as the laser 40) which is movably mounted on a gantry robot 44 provided on an overhead support 46. The support 46 is suspended at each of its ends by a pair of horizontal steel beams 48a,48b in a position extending generally parallel to the axis $A_1$ and conveyors 20,22. The laser 40 is moved along the support 46 in the direction of axis $A_1$ and above the seam line 16 by the robot 44. The robot 44 is driven in movement through the engagement of a motor driven pinion with a rack (not shown) extending horizontally along the support 46. The rack extends a distance along the support 46 so as to permit movement of the laser 40 along approximately 3 meters of the support 46. In this manner, a laser beam 56 (FIG. 7) may be emitted along a predetermined longitudinally extending pathline which is aligned with the seam line 16 to be formed.

FIGS. 4 to 7 show best the sheet clamping units 36,38 which are used to maintain the sheets 12,14 in a fixed position within the apparatus 10 during welding by the laser 40. The clamping units 36,38 are independently operable with unit 36 activatable to first clamp a respective sheet 12, and unit 38 activatable to clamp sheet 14. Clamping unit 36 and clamping unit 38 have essentially the identical construction with like reference numbers used to identify like components. For clarity and brevity, clamping unit 36 is described in detail herebelow. It is to be appreciated from FIGS. 4 to 7 that clamping unit 38 is provided having a mirror structural arrangement to clamping unit 36 and operates in a like manner.

Figure 4:
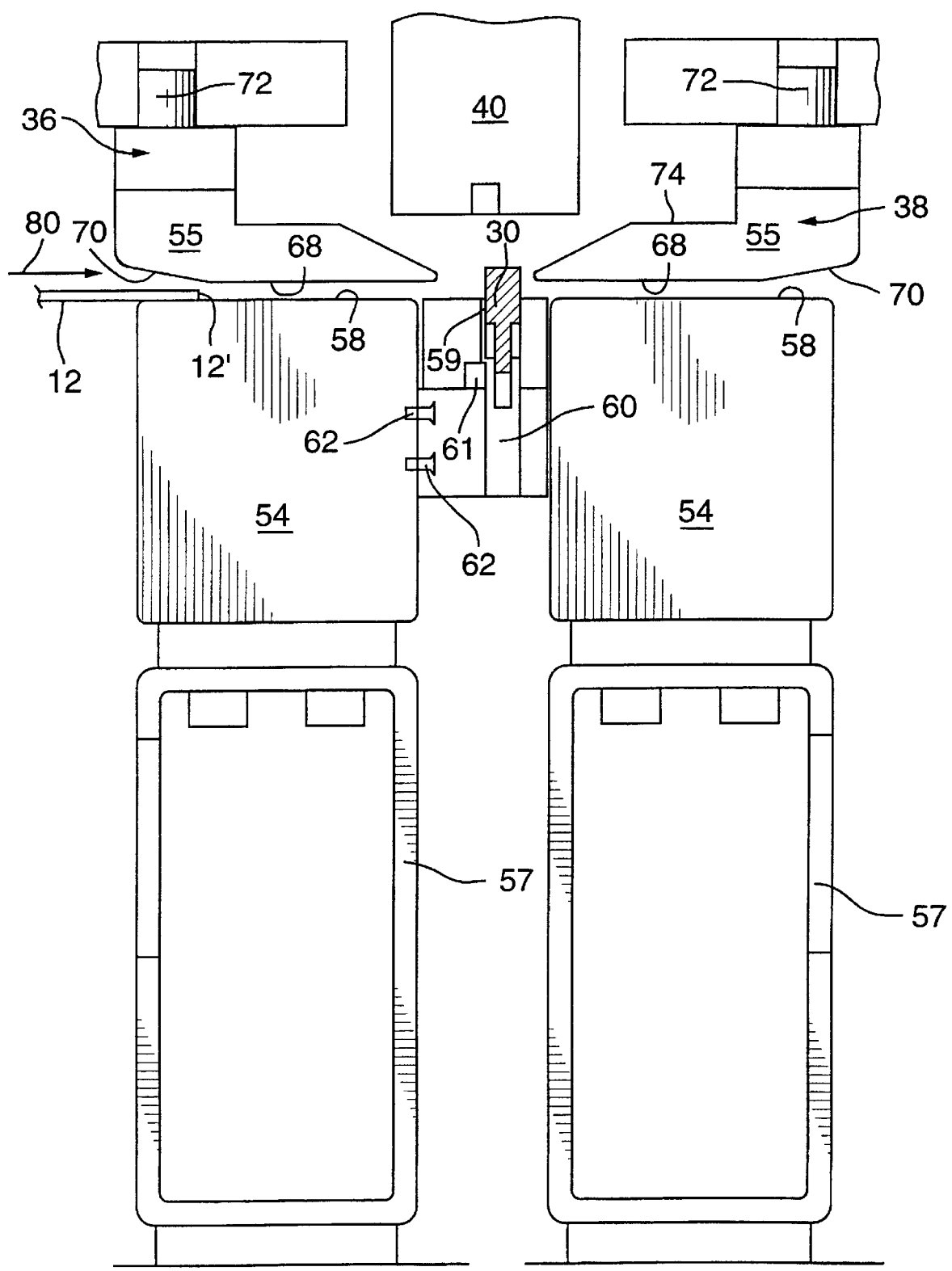
FIG. 4 is an enlarged partial cross-sectional view of the welding apparatus of FIG. 1 taken along line 4–4', showing the insertion of a first sheet blank to be welded.
Figure 5:
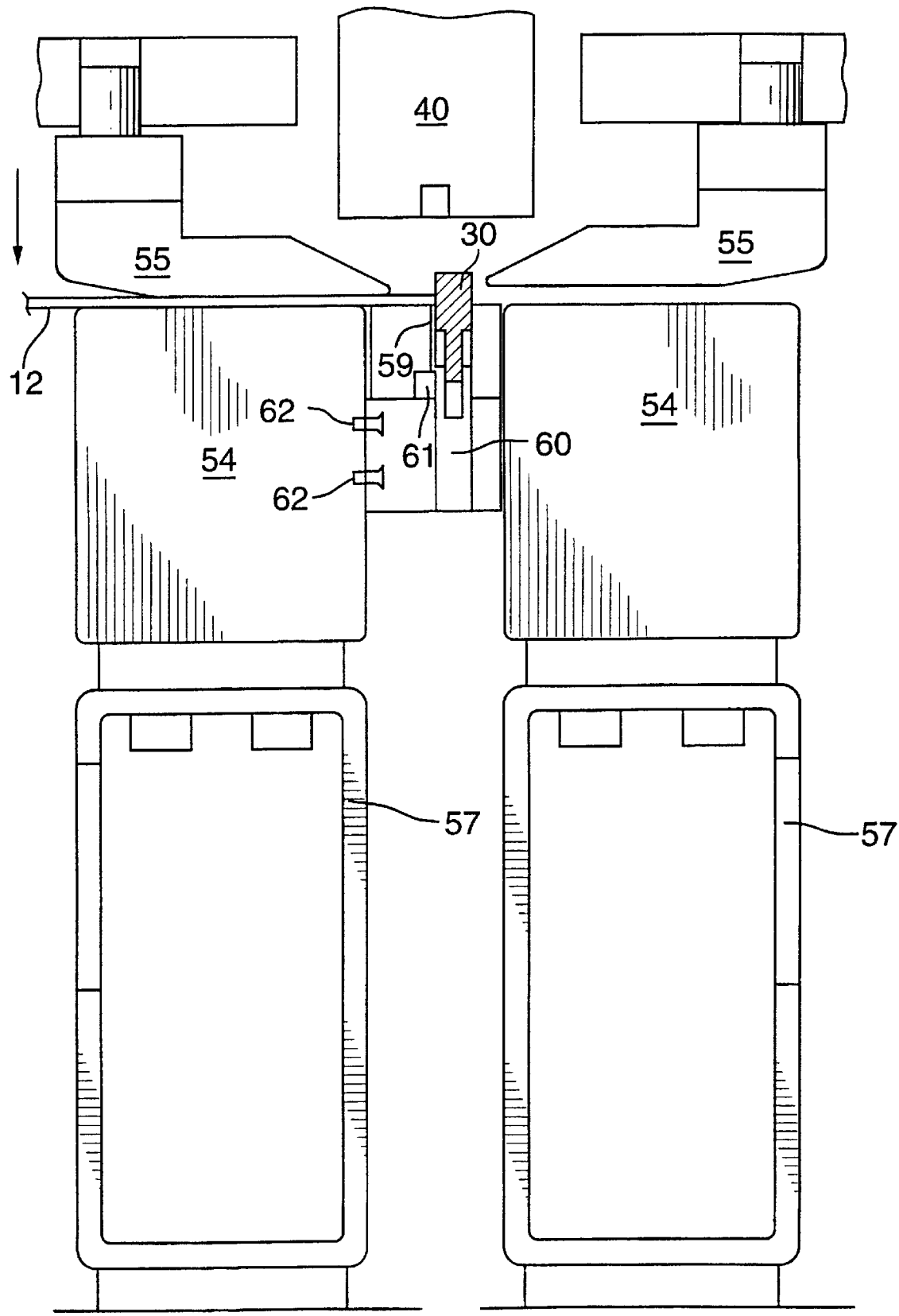
FIG. 5 is a cross-sectional view of the welding apparatus as shown in FIG. 4 with an edge portion of the first sheet aligned at a predetermined seam line.

Clamping unit 36 includes an elongated electrically operated magnet 54 about 0.3 meters wide and 3 meters in length which extends longitudinally parallel to and adjacent the axis $A_1$, and a number steel clamping shoes 55 provided above the magnet 54 at longitudinally spaced locations. FIG. 4 shows best the electromagnet 54 as having a flat horizontal upper surface 58. The electromagnet 54 shown in FIGS. 1 to 7 has a straight elongated structure and is formed by joining a number of generally rectangular magnet modules 53 end to end in a straight line. If desired, the modular construction of the electromagnet 54 advantageously also enables the electromagnet 54 to curve. In this manner, the electromagnet 54 may also be positioned following curved or bent seam lines, by incorporating one or more curved modules 53 or by simply rearranging the positioning of the modules 53. The modules 53 each consist of a permanent magnet which contains an electric coil. When electrically pulsed, the coils in the modules 53 produce variable magnetic fields to provide the required downward magnetic forces along the length of the electromagnet 54. The use of modules 53 in the construction of the magnet 54 advantageously enables the modification of the clamping units 36,38 to achieve optimal clamping of different shaped blanks.

The upper surface 58 of the electromagnet 54 acts both as a support upon which an associated one of the sheets to be joined rests, and as a hold-down mechanism for retaining the clamping shoes 55 in a sheet-clamping position. The electromagnet 54 extends along a horizontal support beam 57. The beam 57 in turn is mounted at each of its ends to two vertical beams 64a,64b (see FIG. 3) which are spaced apart a sufficient distance to enable the sheets 12,14 and finished workpiece 18 to move substantially unhindered therebetween. Although not essential, a servo-motor drive unit 66 is preferably also provided to vertically raise or lower the beam 57 and electromagnet 54 of clamping unit 38 on the beams 64a,64b, relative to the electromagnet 54 of clamping unit 36. It is to be appreciated, that the servo-motor drive unit 66 advantageously permits vertical adjustment in the relative positioning of the sheets 12,14, as for example, to permit sheets of different thicknesses to be welded together.

In the embodiment shown in FIG. 3, nine identical steel shoes 55 are provided in each clamping unit 36,38. The shoes 55 are each formed from cast iron and extend laterally across almost the entire width of the electromagnet 54, and longitudinally a distance of between about 0.2 to 0.4 meters. Each of the shoes 55 includes a generally flat horizontal bottom surface 68 which, when the clamping units 36,38 are activated, moves against the upper surface of a sheet therein to sandwich it between the bottom of the shoe 55 and the electromagnet 54. A rearward edge portion 70 of the shoe 55, spaced furthest away from the axis $A_1$ and seam line 16 slopes upwardly from the bottom surface 68. As will be described later, the upward slope of the rearward edge portion 70 acts to assist in flattening and directing the sheets 12,14 between the respective electromagnets 54 and shoes 55 as they are slid into position moving the edge portions 12',14' towards alignment with the seam line 16.

The shoes 55 of each clamping unit 36,38 are mounted on associated vertically movable pneumatic piston cylinders 72 positioned on sides of the overhead support 46. By activating the piston cylinders 72, the shoes 55 are vertically moved between a lowered position, where the bottom surface 68 of the shoe 55 engages the upper surface of a sheet thereunder, and a raised position spaced a distance above the electromagnet 54, which is sufficient to enable movement of a sheet between the electromagnet 54 and shoes 55.

It is preferred that when the electromagnet 54 is not activated, the shoes 55 are automatically returned to the raised position, as for example, by means of the servo-control of the cylinders 72, permitting substantially unhindered sliding movement of the sheets 12,14 between associated shoes 55 and electromagnet 54; and whereby the activation of the electromagnets 54 deactivates the cylinders 72, resulting in the lowering of the shoes 55 to return to the lowered sheet engaging position.

Figure 8:
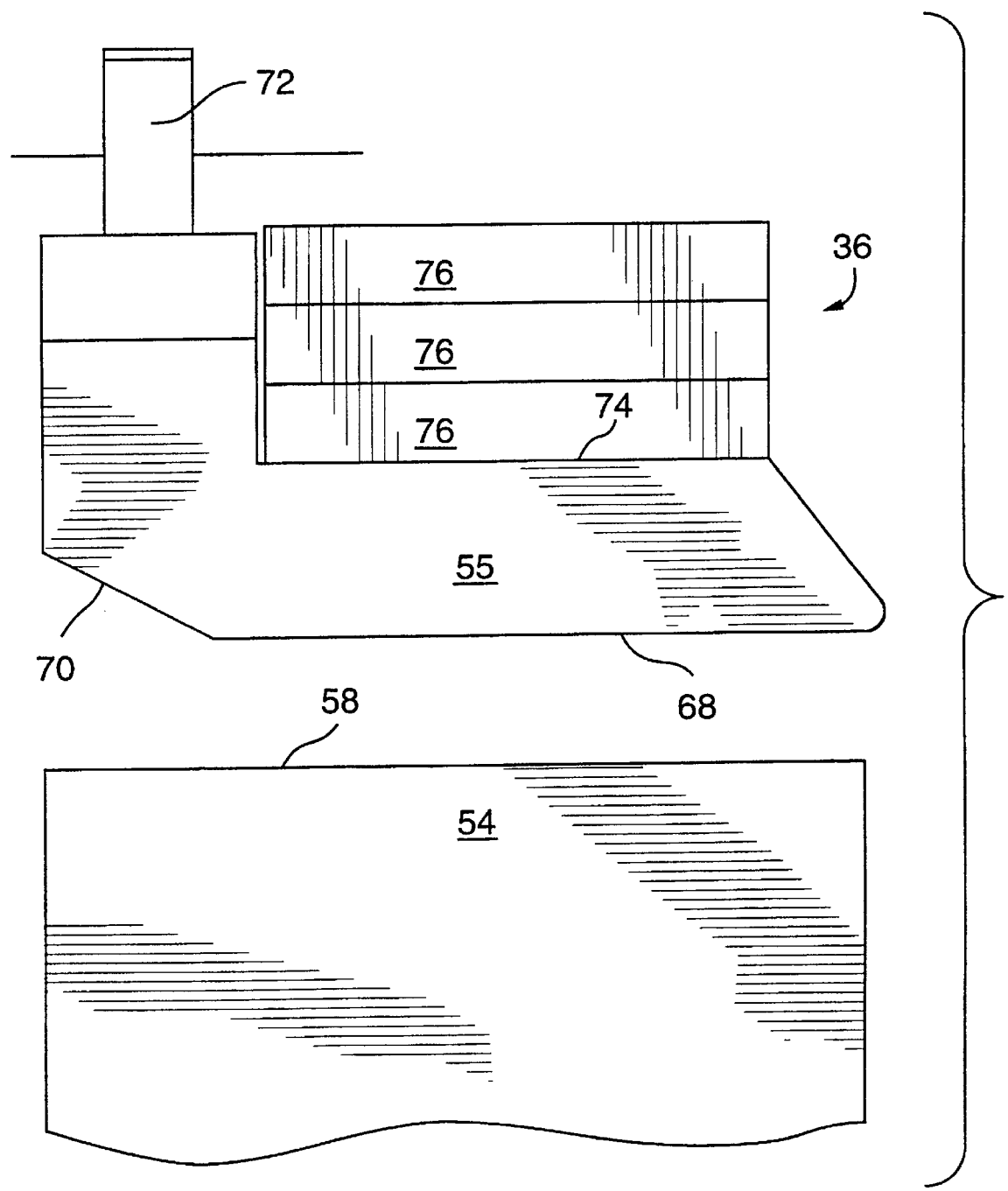
FIG. 8 shows a partial schematic side view of a clamping mechanism in accordance with a further embodiment of the invention.

The shoes 55 are each provided with a generally horizontal flat upper shoulder 74 extending approximately one-half of its width. The upper shoulder 74 advantageously permits placement of one or more rectangular iron bars 76 or other ferromagnetic weights (seen best in FIG. 8) to be placed on the shoe 55. The addition of iron bars 76 may advantageously be used to decrease magnetic reluctance with respect to the electromagnet 54, where thinner sheets 12,14 are to be welded.

FIGS. 4 to 7 show best an elongated 0.25 inch wide laser dump 59 aligned beneath the axis $A_1$ and recessed beneath the upper surfaces 58 of the magnets 54. The laser dump 59 is preferably copper-lined to absorb excess YAG laser energy, and is liquid cooled by pumping cooling water along a longitudinally extending coolant channel 61 which extends beneath the bottom of the dump 59.

The locating pins 30 of the sheet positioning assembly are provided in alignment at longitudinally spaced locations under the support 46. The pins 30 are located in the apparatus 10 with one circumferential edge portion of each pin 30 tangentially aligned with the laser dump 59 and axis $A_1$. In this manner, when the edge portion 12' of the steel sheet 12 is moved against the pins 30, the edge portion 12' aligns with each of the laser dump 59, the pathline of an emitted laser beam 56 and the desired seam line 16 of the workpiece 18. As seen best in FIGS. 4 to 7, each locating pin 30 is vertically movable within a corresponding pneumatically operated cylinder 60 which is secured to a vertical side of the electromagnet 54 of clamping unit 36 by bolts 62. By the selective activation or deactivation of the associated cylinders 60, the pins 30 are moved between a raised position, where the pins 30 engage and contact the proximal edge portion 12' of sheet 12, and a lowered position moved vertically a distance below the lower surface of the sheets 12,14.

The positioning rods 32,34 are provided in sets of ten rods on each side of the axis $A_1$. Each set of rods 32,34 is used to move a respective one of the sheets 12,14 to a position so that the proximal edge portions 12',14' are aligned with the predetermined seam line 16. As will be described later, the positioning rods 32,34 are activatable to engage the non-proximate edge portions of the respective sheets 12,14 and slide the sheets 12,14 to a position with their proximal edge portions 12',14' in abutting engagement under the path line of the laser beam 56 for welding.

The overall operation of the laser 40, gantry robot 44 and clamping units 36,38 may be performed manually, but more preferably a microprocessor control 78 (see FIG. 2) is provided. The microprocessor control 78 may be equipped with software whereby the laser 40, gantry robot 44, and clamping unit 36,38 operations may be either pre-set or taught for repeated workpiece 18 production.

The use of the apparatus 10 is best described with reference to FIGS. 2 and 4 to 7. Initially, the servo-motor drive unit 66 is activated to raise or lower the electromagnet 54 of clamping unit 38 relative to the electromagnet 54 of clamping unit 36. The clamping unit 38 is moved so the upper surfaces 58 of the electromagnets 54 of both units 36,38 are at the desired relative vertical position, having regard to the thicknesses of the steel sheets 12,14 to be joined.

The two sheets 12,14 which are to be welded together along their respective proximal edges 12',14' are then placed on a respective conveyor 20,22 with the edge portions 12',14 each oriented towards the axis $A_1$. The conveyors 20,22 are then operated either simultaneously or separately, to move the sheets 12,14 in the direction of arrow 42 into the apparatus 10.

The pneumatic cylinders 60 are next activated to raise the locating pins 30 to a height so as to engage the proximal edge portion 12' of the sheet 12 as it rests on the surface of the electromagnet 54 of clamping unit 36.

The set of locating rods 34 are then individually extended, whereby the rods 34 engage the non-proximal edge portions of the sheet 12. The engagement of the rods 34 with the non-proximal edge portions of the sheet 12 slides the sheet 12 within the apparatus 10. The sheet 12 is moved so that the lower surface of part of the sheet 12 adjacent the edge portion 12' rests upon and is supported by the surface 58 of the clamping unit 36 electromagnet, and the proximal edge portion 12' is moved in the direction of arrow 80 (seen in FIG. 4) against the pins 30 into alignment with the axis $A_1$ and seam line 16. As the sheet 12 moves towards the pins 30, the sheet 12 is moved between the upper surface 58 of electromagnet 54 and shoes 55 of the clamping unit 36 and into engagement with each of the locating pins 30. The engagement of the edge portion 12' of sheet 12 with the pins 30 thereby aligns the edge portion 12' precisely under the path line of the laser beam 56 and seam line 16 in the optimum position for welding. In addition, the movement of the sheet 12 between the shoes 55 and electromagnet 54 of clamping unit 36 acts to flatten the sheet 12, removing any warp or bends from the sheet 12.

With the proximal edge portion 12' engaging each of the locating pins 30, the electromagnet 54 of the clamping unit 36 is activated and the associated shoes 55 are lowered onto the upper surface of the sheet 12. The lowering of the shoes 55 sandwiches the sheet 12 in place between the shoes 55 and electromagnet 54. When activated, the increased magnetic attraction between the electromagnet 54 and its associated shoes 54 pulls the shoes 55 downwardly onto the sheet 12 with a sufficient force selected to preventing movement of the edge portion 12' out of alignment with the predetermined seam line 16. It is to be further appreciated that where sheets of ferromagnetic materials are clamped in place, the magnetic attraction of the sheet 12 directly to the supporting electromagnet 54 further assists in holding the sheet 12 in place.

Figure 6:
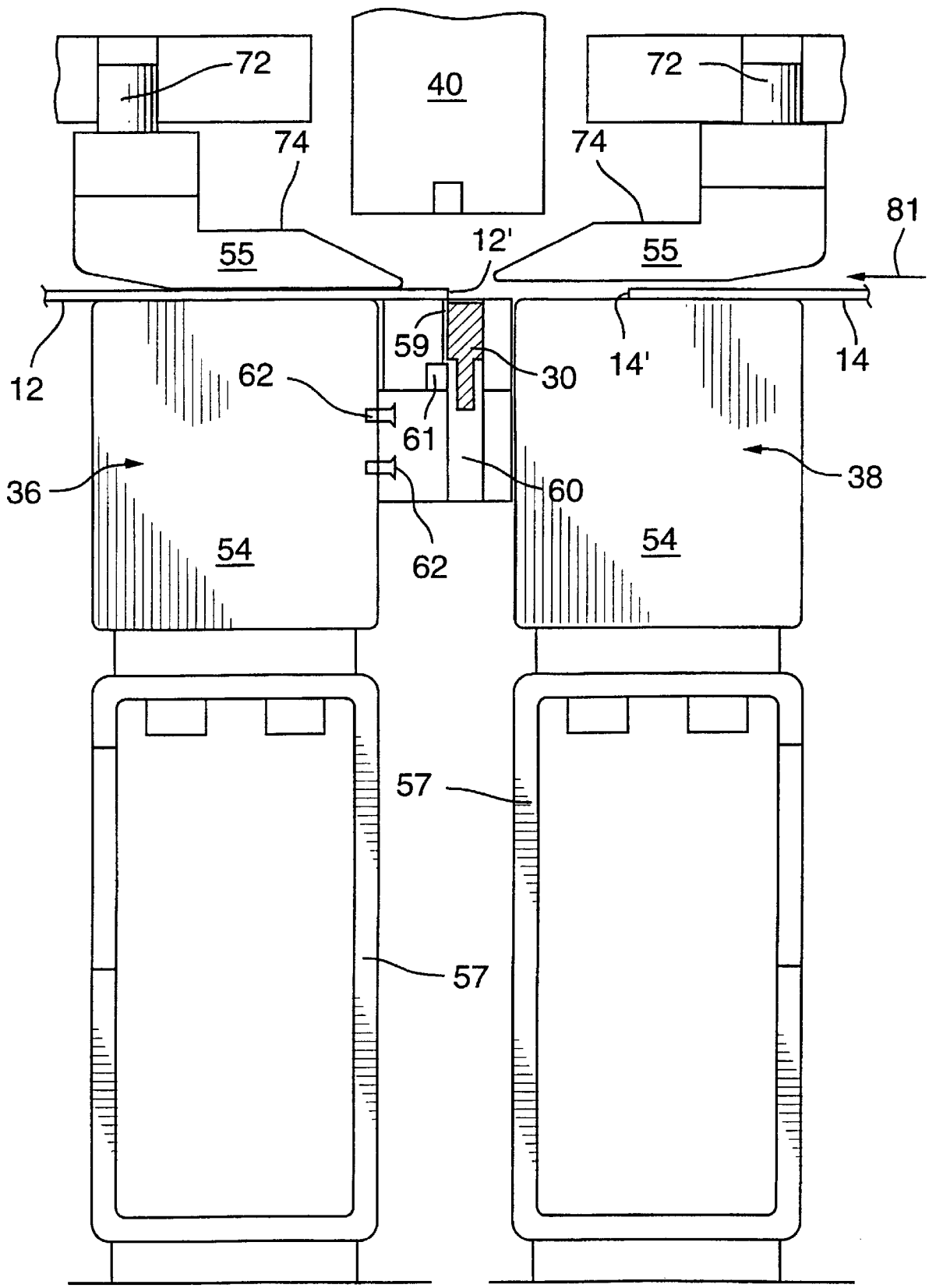
FIG. 6 is a cross-sectional view of the welding apparatus as shown in FIG. 4 showing the insertion of the second sheet blank thereto.
Figure 7:
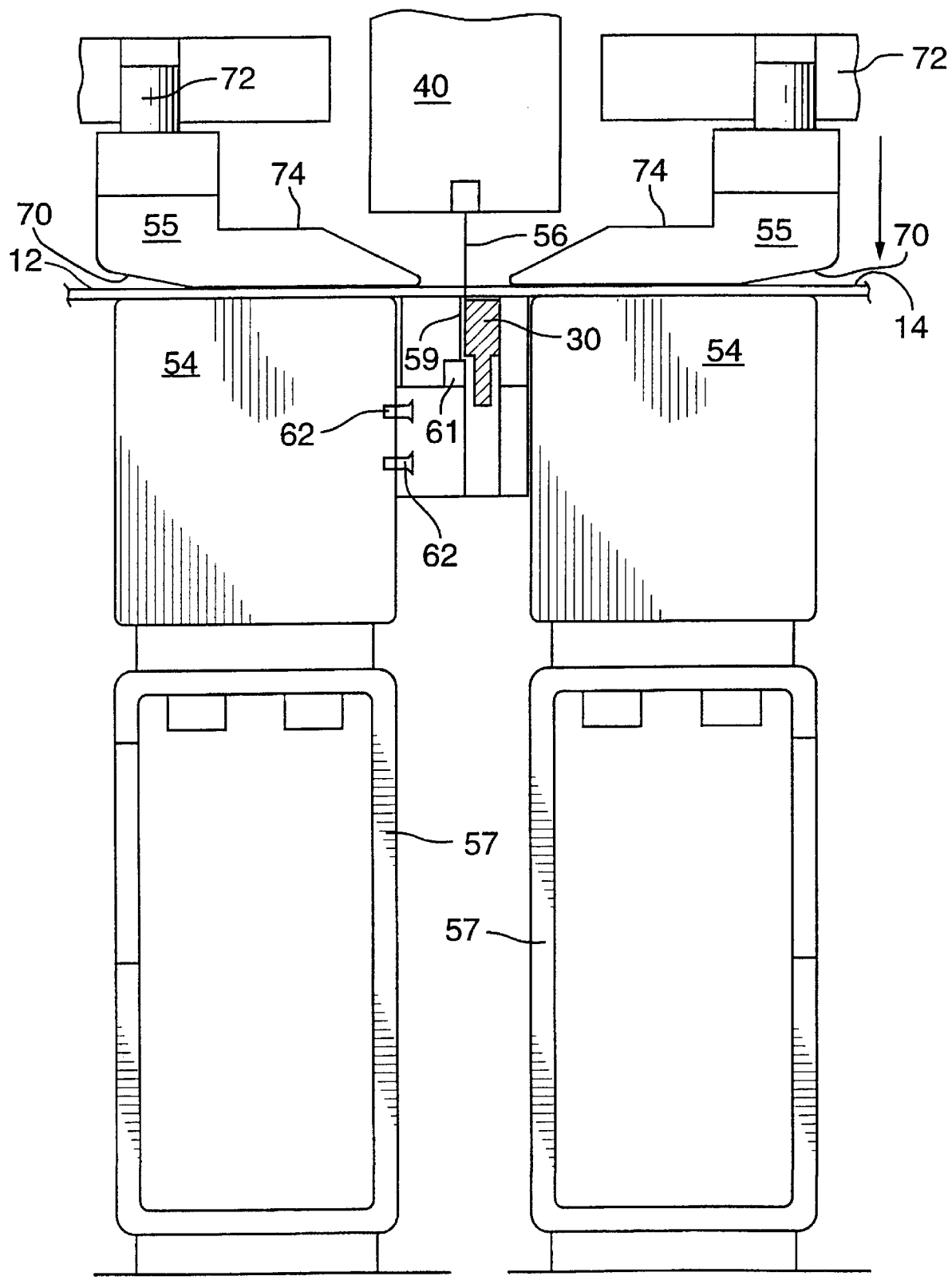
FIG. 7 is a cross-sectional view of the welding apparatus as shown in FIG. 4 showing the proximal edge portions of the first and second sheets in an abutting position aligned with the predetermined seam line.

With the sheet 12 clamped in a welding position with the edge portion 12' aligned with the seam line 16, the cylinders 60 are deactivated to retract the locating pins 30 to the lowered position shown in FIG. 6, wherein the pins 30 are moved beneath both the lower surfaces of the sheets 12,14, and the upper surface 58 of the electromagnet 54 of the clamping unit 38.

The locating rods 36 are then activated to engage the non-proximal edges of sheet 14, and move the sheet 14 towards the axis $A_1$ in the direction of arrow 81 (shown in FIG. 6) so that the proximal edge portion 14' of the sheet blank 14 is moved into abutting engagement with the proximal edge portion 12' of sheet 12. The movement of the sheet 14 by the locating rods 36, similarly slides the lower surface of part of the sheet 14 which is adjacent the edge portion 14' onto the electromagnet 54 of clamping unit 38, so that it is supported thereby. Once the edge portions 12',14' are positioned in the proper abutting engagement, the electromagnet 54 of the clamping unit 38 is activated, and the associated shoes 55 are lowered onto the upper surface of the sheet 14. As with clamping unit 36, the magnetic attraction of the shoes 55 towards the electromagnet 54, pulls the shoes downwardly with sufficient force as to substantially prevent further movement of the sheet 14.

With each of the sheets 12,14 clamped in abutting engagement by the respective clamping units 36,38, the computer control 78 automatically activates the laser 40 and gantry robot 44, to move the head of the laser 40 along the support 46 by the motor driven pinion engaging the rack (not shown). The movement of the laser 40 thereto moves an emitted laser beam 56 along the path line welding the proximal edge portions 12',14' together along the predetermined seam line 16. By the length of travel of the laser 40 along the support 46, weld seams may be formed which are 3 or more meters in length.

The use of the YAG laser 40 has several advantages over conventional $CO_2$ lasers. In particular, the YAG laser 40 is more suited to welding aluminum and aluminum alloys. The YAG laser additionally permits faster weld times of 3 meters per minute and enables simplified fibre optic beam delivery to a comparatively small laser head. In addition, to achieve effective butt welding with conventional $CO_2$ lasers, it is necessary that the edge portions 12',14' of the blanks 12,14 have a highly pre-finished, minor smooth surface. This has heretofore proven to be a significant drawback in the large scale implementation of $CO_2$ lasers in continuous butt-welding processes. In contrast, the YAG laser 40 effectively welds sheets 12,14 having normal sheared edges, without requiring specialized edge treatment of the sheets 12,14.

It is to be appreciated that as the sheets 12,14 are clamped in place by the attraction of respective shoes 55 and electromagnets 54, there is no need to provide the apparatus 10 with a cumbersome and expensive clamp supporting frame to absorb opposing clamping forces associated with conventional welding apparatus. Further, the permanent magnets used in the modules 53 are selected so that when the electromagnet 54 is not activated, the sheets 12,14 and workpiece 18 may be moved into and out of the apparatus 10.

Following welding, the electromagnets 54 of both clamping units 36,38 are deactivated and the associated shoes 55 are raised by their respective piston cylinders 72 to unclamp the finished workpiece 18. The conveyors 20,22 are then activated to simultaneously move the finished workpiece 18 out of the apparatus 10 in the direction of arrow 42 (shown in FIG. 2) while simultaneously moving two new sheets to be joined therein.

The foregoing construction advantageously permits sheets made of non-ferromagnetic materials, such as tin or aluminum, to be securely clamped in place during welding, by their being sandwiched between the magnetically attracted associated shoes and electromagnets.

While the YAG laser 40 is disclosed as being moved along the support 46 by the engagement of a rack by a motor driven pinion, other drive mechanisms to be used with the gantry robot 44 are also possible and will become apparent. Depending on the workpiece 18 to be formed, the laser 40 may be operated to emit a continuous laser beam 56 which performs continuous welding along the whole of the seam line 16, or alternately, the laser 40 may be pulsed to form welds at longitudinally spaced locations. Similarly, while the laser 40 disclosed with reference to FIGS. 1 to 7 is preprogrammed to travel along a predetermined seam line, the laser could also include a seam line sensor which automatically senses the spacing between two sheet blanks and guides the laser 40 in movement along the sensed seam line.

Figure 9:
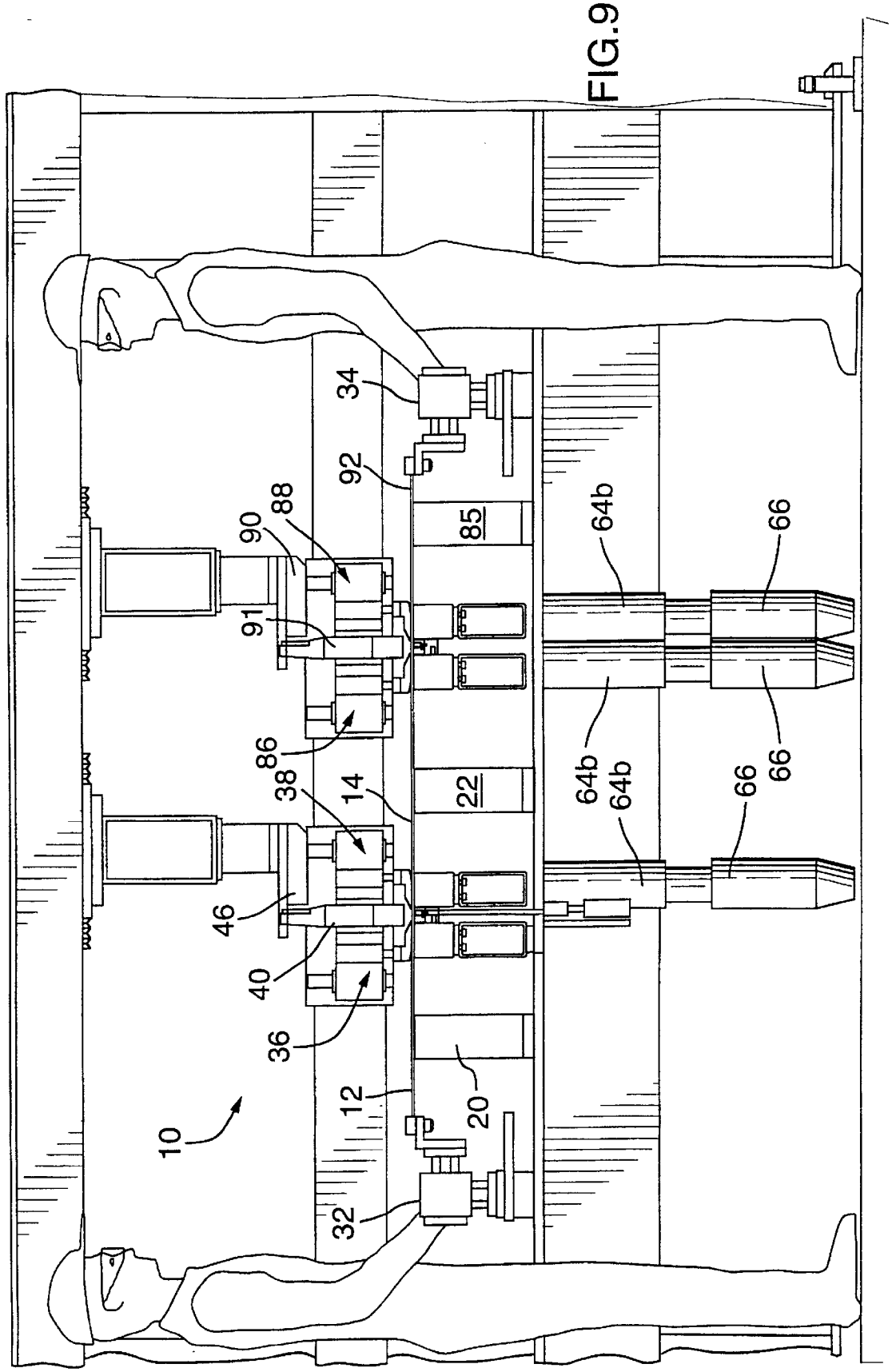
FIG. 9 shows a schematic end view of the welding apparatus in accordance with a second preferred embodiment of the invention.
Figure 10:
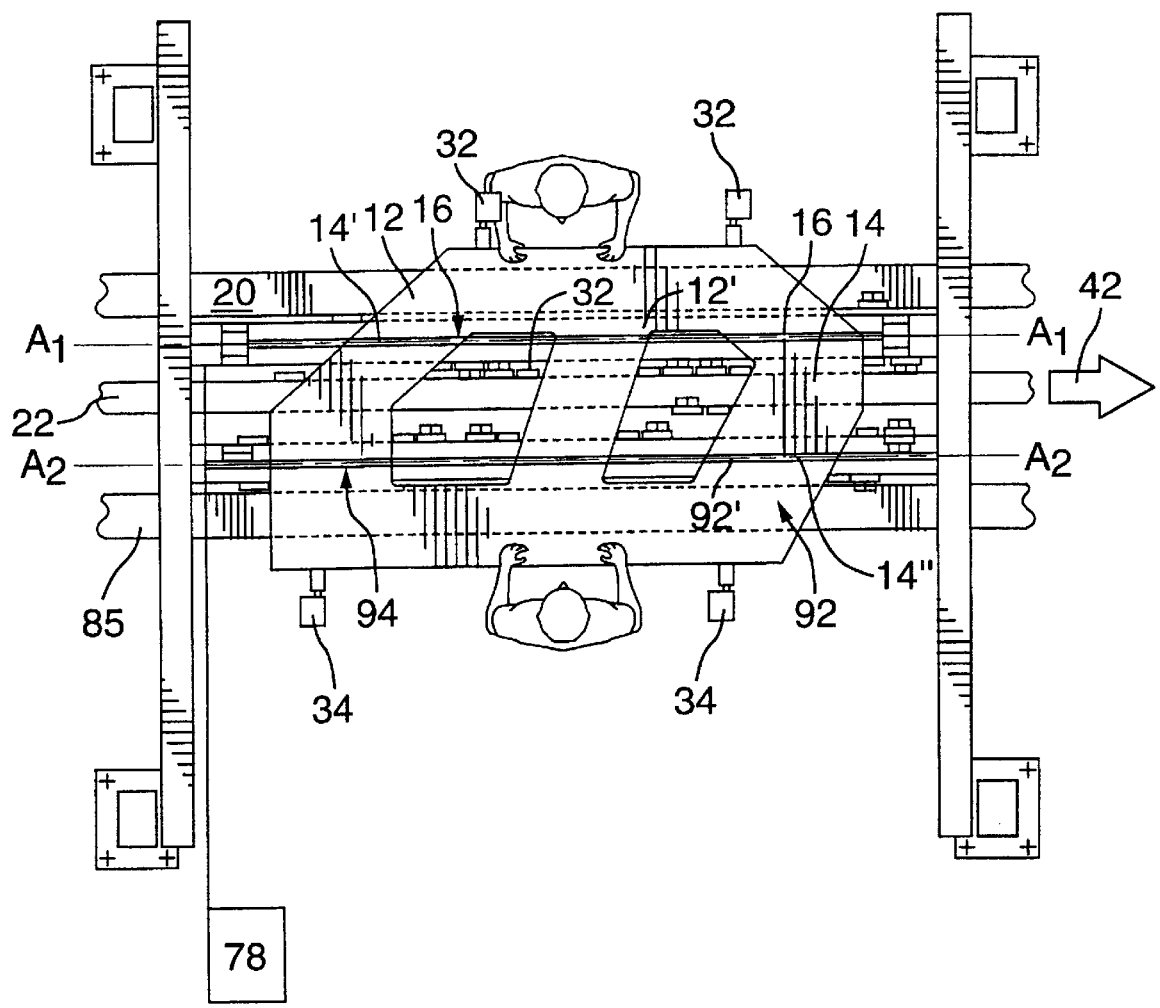
FIG. 10 shows a schematic top view of the apparatus of FIG. 9 showing the formation of a composite workpiece blank thereon.

An alternate embodiment of the present invention is illustrated in FIGS. 9 and 10 wherein like reference numerals are used to identify like components. The apparatus 10 shown in FIGS. 9 and 10 has all of the components as that shown in FIG. 1, however, a third magnetic stepping conveyor 85, two additional clamping units 86,88 and a second YAG laser 90 are additionally provided. The clamping units 86,88, and laser 90 are used to weld not only sheets 12 and 14 together in the manner described with reference to FIGS. 4 to 7, but also weld an edge portion 92' of third steel sheet 92 to an edge portion 14" of steel sheet 14 which is remote from edge portion 14'.

The apparatus 10 welds the sheet 92 to sheet 14 along a second seam line 94, aligned with an axis $A_2$ which is parallel to axis $A_1$ and seam line 16. As in the embodiment shown in FIGS. 1 to 7, servo-motor drive units 66 are provided to permit not only vertical adjustment of the height of the electromagnet 54 of unit 38 relative to that of unit 36, but also vertical adjustment of the electromagnet 54 of units 86 and 88. The laser 90 is movably provided on a second overhead support 91 which extends parallel to support 46 in essentially the same manner as laser 40.

In use of the apparatus 10 of FIG. 9 and 10, the sheet blanks 12 and 14 are joined together in the identical manner as that described with reference to FIGS. 4 to 7. Following the welding of sheets 12,14, the third conveyor 85 is operated to move the sheet 92 in the direction of arrow 42 into the apparatus 10, so that the edge portion 92' of the sheet 92 which is proximate to edge portion 14" is positioned facing theretowards. The clamping unit 86 is activated to clamp the sheet 14 in the same manner as clamping units 36,38. In the same manner as clamping unit 38, clamping unit 86 is activated to clamp the sheet 14, with sheet 12 having been welded thereto, in position with the edge portion 14" aligned with the predetermined seam line 94. The third sheet 92 is then moved so that its proximal edge portion 92' which is proximate edge portion 14" is positioned in abutting relationship therewith. Once the sheets 14,92 are so positioned, the fourth clamping unit 88 is activated to clamp the sheet 92 in position with the edge portions 14',92' abutting and aligned with seam line 94. The second laser 90 is then activated and moved by a gantry robot along the support 91 to weld sheets 14 and 92 together along the second seam line 94.

It is contemplated that the sheet positioning assembly shown in FIGS. 9 and 10 could also include additional locating pins and/or positioning rods (not shown) to assist in orienting the proximate edge portions 14" and 92' in the correct alignment with the seam line 94. Where a second set of locating pins is used, it is to be appreciated that following the welding of the sheet 12 to the sheet 14, the clamping units 36,38 are deactivated and the locating rods 34,36 further adjusted to move the welded sheets 12,14 to a corrected position prior to welding sheet 92.

While FIGS. 9 and 10 show the apparatus 10 as including two lasers 40,90 which each travel along parallel path lines, the invention is not so limited. Depending on the workpiece which is to be produced, additional lasers and clamping units could also be provided. The lasers 40,90 may also be movable along perpendicular horizontal and/or vertical directions, or alternately along curved or irregular non-linear path lines, as for example, to produce workpieces having curved or irregular seam lines or the like.

Figure 11:
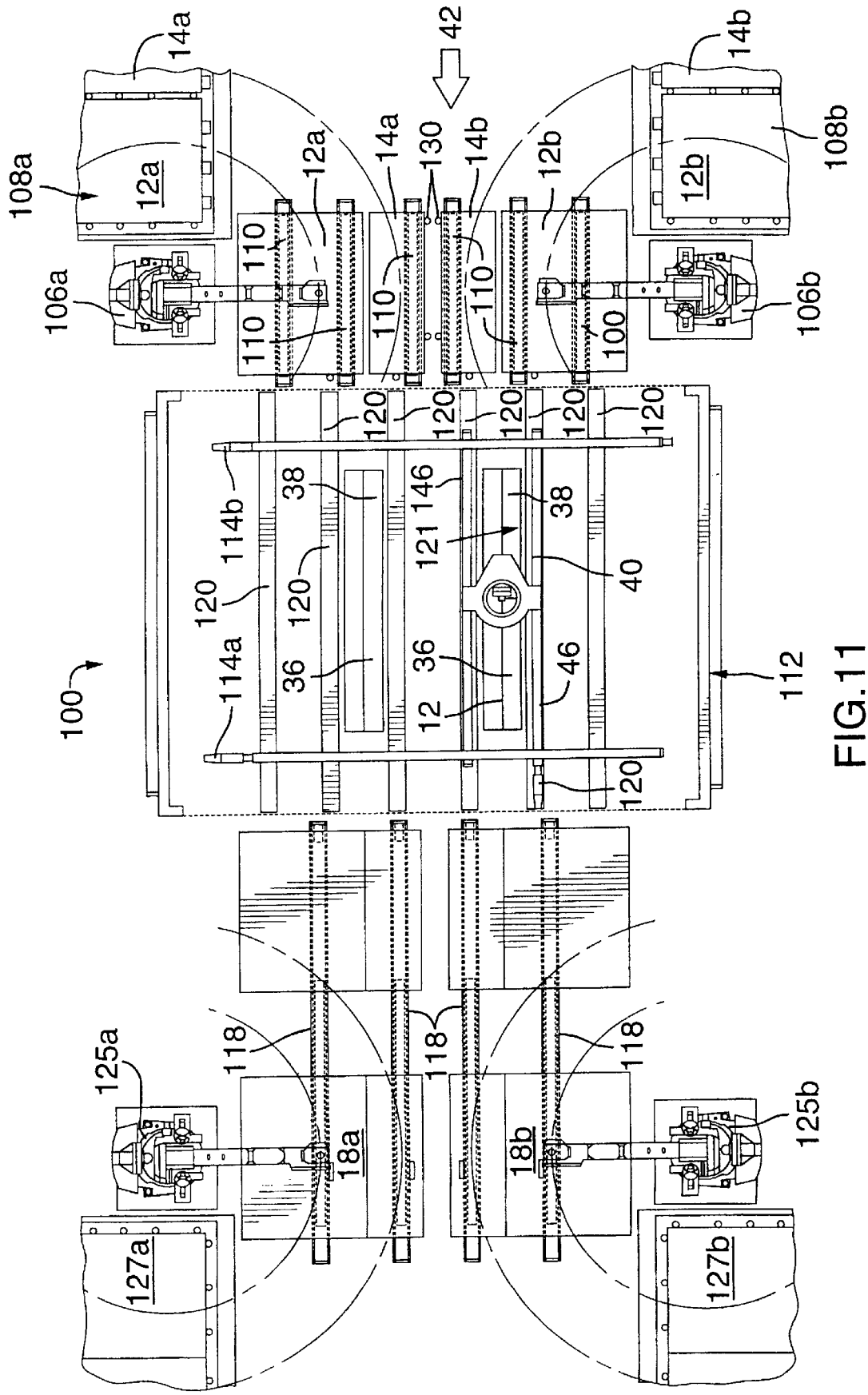
FIG. 11 shows a schematic top view of a production assembly line for forming composite workpieces in accordance with a third embodiment of the invention.
Figure 12:
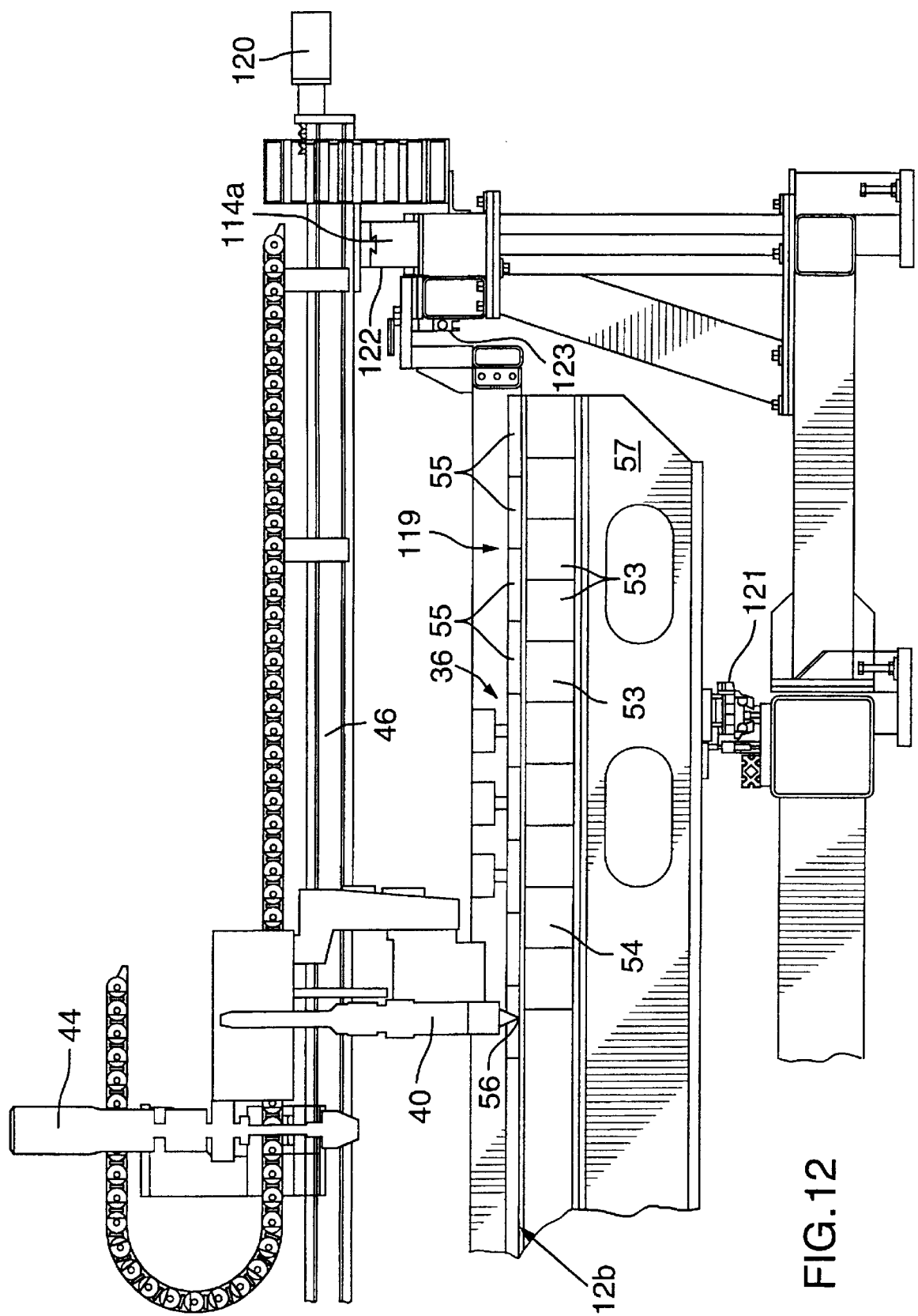
FIG. 12 is a partial sectional side view of the welding apparatus shown in FIG. 11 taken along line 13–12' and showing the laser apparatus used to weld sheet blanks.

Another embodiment of the present invention is illustrated in FIGS. 11 and 12, wherein like reference numerals are used to identify like components. FIGS. 11 and 12 show the apparatus 10 used in a production line 100 for the continuous manufacture of composite workpieces 18.

The production line 100 is configured for the concurrent manufacture of two completed workpieces 18a,18b, and includes a single laser 40, which is configured for 3 axis movement. As seen best in FIG. 12, the entire laser 40 and support 124 is movable in a first horizontal direction via a gantry robot 44 along an overhead support 46 and a slave support 146. As in the embodiments shown in FIGS. 1 to 7, the laser 40 is movable via a gantry robot 44 along a rack provided on overhead support 46. The supports 46,146 are further slidable in a second horizontal direction perpendicular to the first on parallel spaced end supports 114a,114b which support each end of the support 46, and slave support 146. A servo-drive motor 120 is provided at the end of support 46 engaging a rack 122 extending along one support 114 thereby permitting the laser beam 56 movement in any horizontal direction. In this manner, by moving the laser 40 along the support 46, and moving the support 46 along supports 114a,114b, the laser beam 56 may be moved along substantially any path. In addition, it is preferable that the laser 40 be vertically movable, thereby permitting its movement along all three axes and provide increased adaptability to the apparatus 10.

In use, pairs of component sheets 12a,14a and 12b,14b are moved sequentially via robotic vacuum lifts 106a,106b from respective supply stacks 108a,108b, and are positioned on parallel magnetic feed conveyors 110. The robotic vacuum lifts 10a,106b are used to move each component sheet 12a,14a and 12b,14b, respectively through an initial qualifying procedure, to ensure correct initial positioning of the sheets on the feed conveyors 110. In this regard, sets of locating pins 130, which are substantially identical to pins 30, are provided at spaced locations between the conveyors 110 to position the sheets in the desired initial position.

Each robotic vacuum lift 106a,106b operates with suction cups used to initially pick up the sheets 12 and 14 under a high vacuum pressure, so as to fixedly retain each sheet as it is raised from the supply stack 108. As the sheet is moved to a position immediately above the conveyors 110, the suction pressure used to hold the sheet is reduced. The reduction suction pressure is chosen so that the retained sheet continues to be suspended by the vacuum force of the lift 106, while permitting the sheet to be slid laterally relative to the vacuum lift 106. The lift 106 is then moved to bring the retained sheet against one set of pins 130 which have been extended above the top surface of the conveyors 110. By moving the edges of the sheets against the pins 130, the sheets may be slid on the lift 106 into the desired initial position on the conveyors 110. Following the positioning of the sheets, the vacuum lift 106 is deactivated to release the sheet, and the pins 130 are lowered to permit the sheets to be conveyed for welding.

Once the respective pairs of sheets 12a,14a and 12b,14b are in the desired initial position, the feed conveyors 110 move the pairs of sheets 12a,14a and 12b,14b in the direction of arrow 42, into a laser operations room 112 in which the apparatus 10 is housed. The laser operations room 112 provides an added safety feature whereby plant workers are shielded by the room 112 from YAG laser energy emitted by the laser 40. In this regard, the room may be provided with mail box or sliding doors (not shown) which close to optically isolate the apparatus 10 during welding operations.

The conveyors 120 in turn convey the respective pairs of component sheets 12a,14a and 12b,14b into respective clamping units 36a,38a and 36b,38b which straddle one of the parallel paths along which the laser moves.

The blanks 12a,14a and 12b,14b are positioned in the clamping units 36a,38a and 36b,38b in the same manner as described in FIGS. 1 to 7 aligned on a respective pair of electromagnets 54. In the manner described, once positioned, the sheets 12a,14a and 12b,14b are secured in place by clamping shoes 55 (FIG. 12). The laser 40 is then activated to first weld blank 12a to blank 14a, and then by moving the laser 40 and supports 46,146 relative to supports 114, to weld blank 12b to blank 14b.

The feed conveyors 110 may be used to simultaneously feed the pairs of sheets 12a,14a and 12b,14b into the laser operations room 112 and onto aligned magnetic conveyors 120. Preferably, however, the production line 100 is computer controlled so that the right half of the line 100, which is shown as the top half of FIG. 11, operates independently of the left half. In this manner, the conveyors 100 may be used to independently convey the pairs of sheets 12a,14a and 12b,14b into laser operations room 112. The applicant has appreciated that independent left and right operations advantageously enable maximum production efficiency. In particular, while clamping units 36,38 are used to position one pair of sheets 12a,14a, the laser 40 can be used to weld the other pair 12b,14b along the seam line.

Once the completed workpieces 18a,18b have been formed, the conveyors 120 move the workpieces 18a,18b out of the laser operations room 112 onto aligned exit conveyors 118 which convey the composite workpieces 18a,18b to robotic lifts 125a,125b for placement in finished composite stacks 127a,127b.

FIG. 12 shows the shoes 55 as being mounted on a second steel beam 119, which is spaced above a corresponding electromagnet 54, and below the support 46. The shoes 55 are movably coupled to the beam 119 by pistons (not shown) in essentially the same manner as the coupling of the shoes 55 to the support 46 shown in FIGS. 4 to 7. The electromagnets 54 and beams 119 are movable along respective slides 121,123. The slides 121, 123 extend perpendicularly to each respective magnet 54 and beam 119 and allow adjustment of the lateral positioning of the clamping units 36,38, for welding different workpieces 18.

Figure 13:
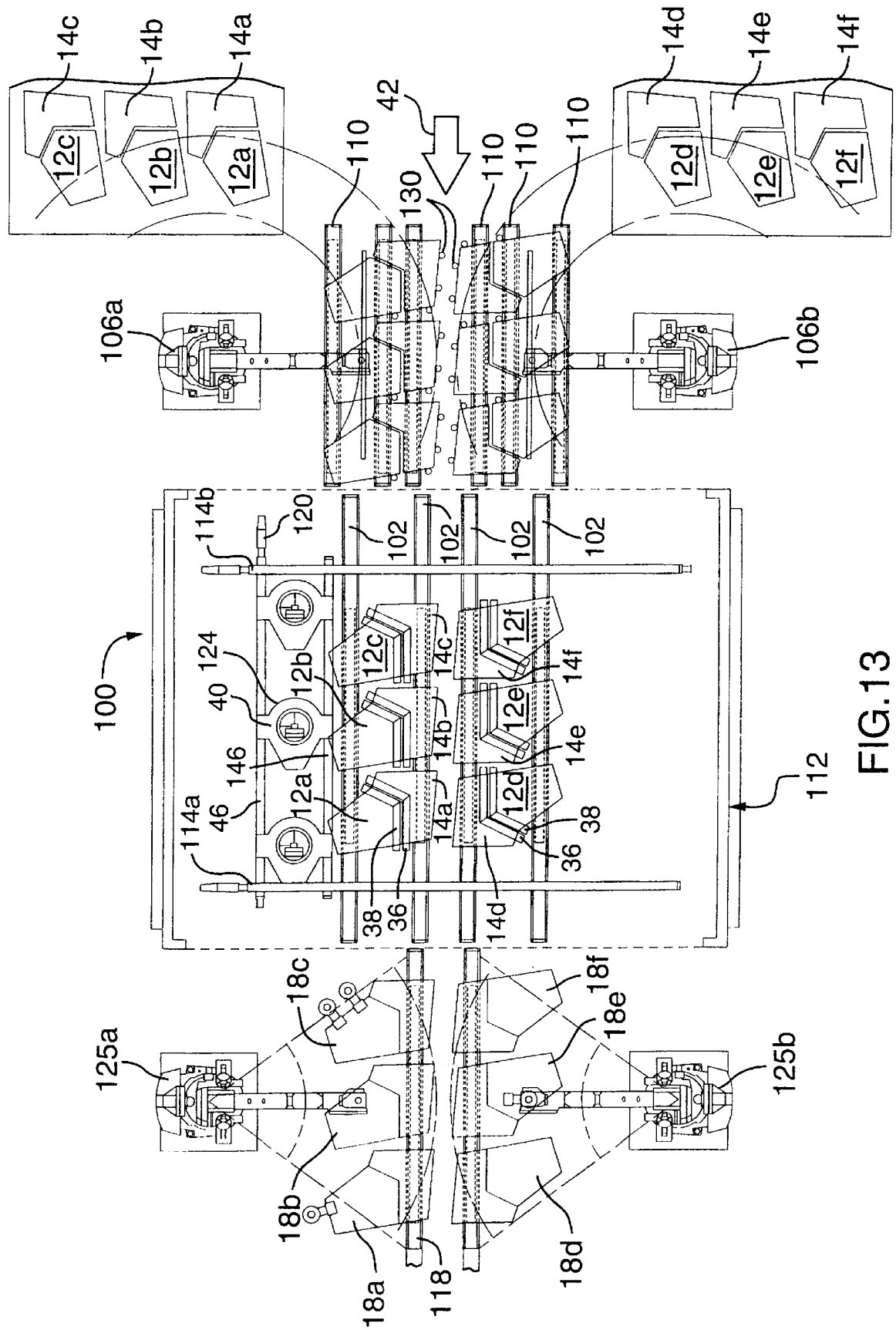
FIG. 13 shows a schematic top view of a production assembly line for forming composite workpiece blanks in accordance with a fourth embodiment of the invention.
Figure 14:
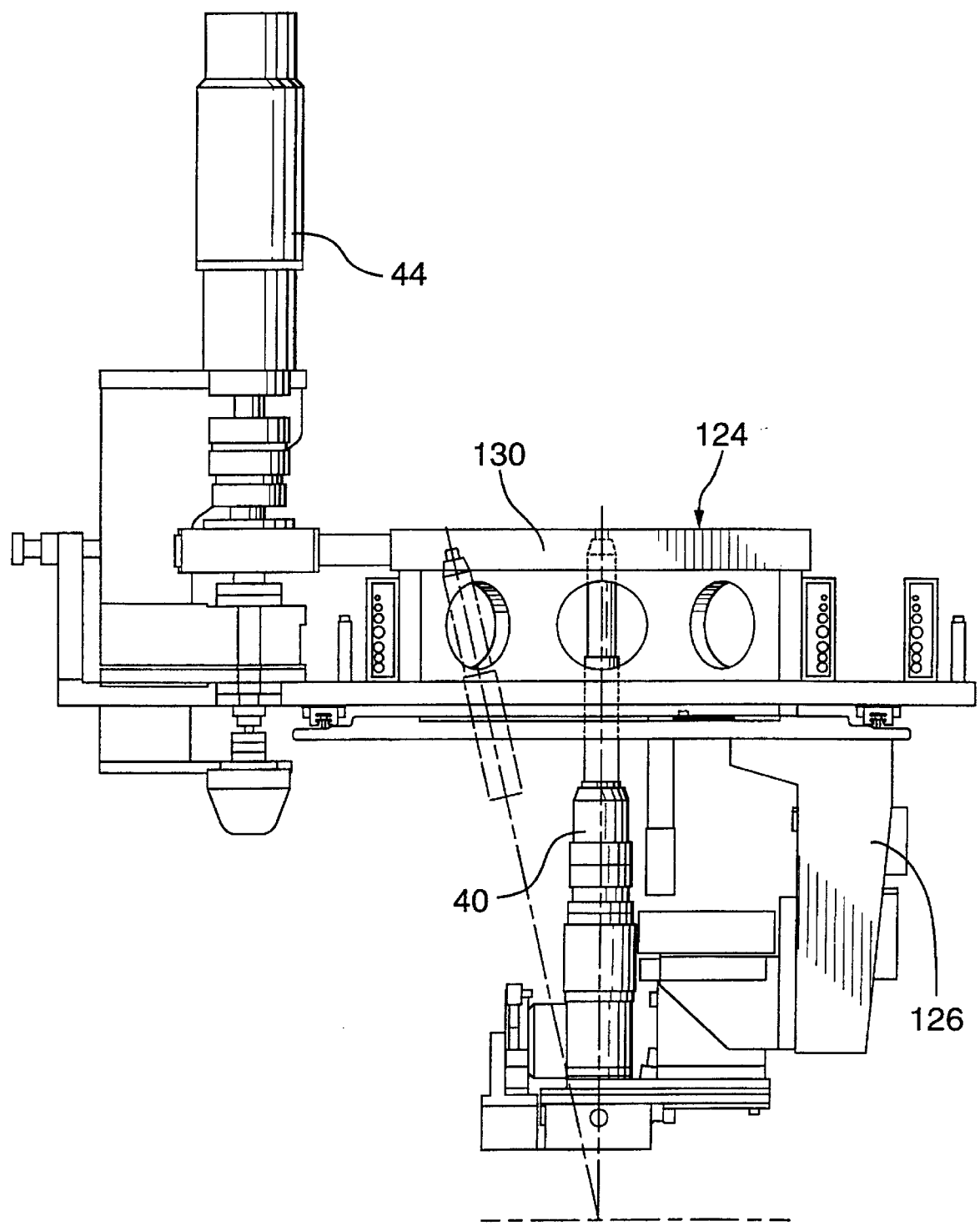
FIG. 14 shows a schematic side view of the laser welding apparatus shown in FIG. 13.

A further embodiment of the present invention is illustrated in FIGS. 13 and 14 wherein like reference numerals are used to identify like components. FIG. 13 shows a component production line 100 adapted for the simultaneous manufacture of completed composite workpieces 18a–f using a laser 40 which is rotatably mounted within an overhead support 124 shown best in FIG. 14. As in the embodiment shown in FIG. 11, the laser 40 is adapted for 3 axis movement on supports 46,146 and 114a,114b. The laser 40 is, however, additionally provided on an arm assembly 126 which is journalled in rotational movement along an inner edge portion of a hollow supporting cylinder 130.

The production line of FIG. 13 operates in a similar manner to that shown in FIG. 11, with the exception that six pairs of component sheets 12a,14a, 12b,14b, 12c,14c, 12d, 14d, 12e,14e, 12f,14f are welded within the laser operations room 112 at any one time. In addition, with the apparatus 10 shown in FIG. 13 welding of the sheets 12,14 occurs along a curved line. In this regard, the configuration of the magnet modules 53 and shoes 55 are modified to reflect the curved path of the laser beam 56.

In the production line FIG. 13 and 14, a single laser 40 may be used to sequentially weld each pair of sheet components 12,14 or, additional lasers (shown in phantom) may further be provided. The path of laser beam 56 movement may be preprogrammed to follow a precise repetitive path which is preset having regard to the blank 12,14 configuration and the weld seam 16. More preferably, however, the laser 40 is provided with a seam tracking optic sensor which automatically follows any spacing between the blanks 12,14 and centres the laser beam 56 thereon to perform welding operation.

While FIG. 3 illustrates the clamping unit 36 as including a number of individual shoes 55 spaced longitudinally over a corresponding electromagnet 54, fewer larger, or even a single elongated shoe could alternately be provided without departing from the scope of the present invention.

Although the preferred embodiment of the invention discloses the use of a YAG laser to weld the sheet blanks together, depending on the sheet material to be joined, other welding apparatus, including plasma arc or electron beam welding apparatus, arc welding apparatus or the like could also be used and will now become apparent.

The use of cast iron shoes 55 advantageously provide an economical and easily manufactured construction which has a high degree of magnetic susceptibility, so as to maximize the magnetic attraction between the shoe 55 and electromagnet 54. If desired, however, the shoes may also be formed from steel or other ferromagnetic materials. Alternately, in another possible construction, the shoe may itself be provided with an electromagnetic insert or coil for inducing a magnetic polarity therein which is opposite to that of the underlining portion of the supporting electromagnet.

While the preferred embodiment describes the use of the present invention in butt welding two or more sheets 12,14 other applications are also possible. For example, by inclining the laser beam relative to the vertical axis, the present invention may also be used to mash weld two or more sheet blanks together.

Although FIGS. 4 to 7 show the locating pins 30 as being movable in a cylinder 60 secured to electromagnet 54, other constructions are also possible. The pins 30 could, for example, be mounted to a support suspended above one or both magnets 54, and move downwardly into bores formed in the upper magnet surface 58. In such a configuration the magnets 54 would be separated only by the laser dump 59 and advantageously support the portions of the blanks 12,14 closest to the edge portions 12',14' to be welded.

While the detailed description of the invention describes and illustrates preferred embodiments of the invention, the invention is not so limited. Many modifications and variations will now appear to persons. skilled in this art. For a definition of the invention, reference may be had to the attached claims.

We claim:

1. An apparatus for forming a workpiece by aligning and butt welding together in an abutting configuration proximal edge portions of first and second component sheets, said apparatus including, welding means for welding the proximal edge portion of the first sheet to the abutting proximal edge portion of the second sheet along a seam line, positioning means for positioning the proximal edge portion of said first sheet in a welding position, first sheet supporting means for supporting said first sheet with said edge portion of said first sheet in said welding position, the first sheet supporting means including, first clamping means for releasably retaining said first sheet in said apparatus during welding, the first clamping means comprising, first magnetic hold-down means for engagingly supporting a first side of said first sheet, said first magnetic hold-down means comprising a series of electronically switchable permanent magnets arranged in an elongated array, and first shoe means for engaging the second other side of said first sheet, the first shoe means characterized by magnetic susceptibility and being movable relative to said first hold-down means between a forward position, wherein said first shoe means is moved towards said first hold-down means to substantially prevent movement of said first sheet therebetween, and a rearward position, wherein said first shoe means is moved away from said first hold-down means to permit substantially unhindered movement of said first sheet therebetween, the first clamping means being activatable to produce a magnetic field in the first hold-down means sufficient to magnetically attract the first shoe means to the forward position and clamp the first sheet therebetween, and second sheet supporting means for supporting said second sheet with said proximal edge portion of said second sheet in a generally abutting relationship with said proximal edge portion of said first sheet.

2. An apparatus as claimed in claim 1 wherein said second sheet supporting means includes, second clamping means for releasably retaining said second sheet in said apparatus during welding, the second clamping means comprising, second electromagnetic hold-down means for engagingly supporting a first side of said second sheet, and second shoe means for engaging the second other side of said second sheet, the second shoe means characterized by magnetic susceptibility and being movable relative to said second hold-down means between a forward position, wherein said second shoe means is moved towards said second hold-down means to substantially prevent movement of said second sheet therebetween, and a rearward position, wherein said second shoe means is moved away from said second hold-down means to permit substantially unhindered movement of said second sheet therebetween, wherein the second clamping means is activatable to produce a magnetic field in the second hold-down means sufficient to magnetically attract the second shoe means to the forward position to clamp the second sheet therebetween.

3. An apparatus as claimed in claim 2 wherein said first and second supporting means support said respective first and second sheets thereon in a substantially horizontal orientation, said positioning means including at least one locating pin vertically movable between a first sheet engaging position, wherein said pin is positioned relative said first supporting means to engage the proximal edge portion of said first sheet thereon, and a second position wherein said pin is moved relative to said second supporting means whereby the edge portion of said second sheet may be moved into direct engagement with the edge portion of said first sheet.

4. An apparatus as claimed in claim 3 wherein said first and second support means are adjustable vertically relative to each other.

5. An apparatus as claimed in claim 1 wherein said first support means includes magnetic indexing conveyor means for movably supporting said first sheet thereon.

6. An apparatus as claimed in claim 3 wherein said second shoe means comprises an elongated steel shoe and said second hold-down means comprises an elongated electromagnet, each of said shoe and said electromagnet extending longitudinally generally parallel to and adjacent said seam line.

7. An apparatus as claimed in claim 3 wherein said first shoe means comprises a plurality of shoe members spaced in a longitudinal direction generally parallel to and adjacent said seam line.

8. An apparatus as claimed in claim 3 wherein said welding means comprises a yttrium aluminum garnet laser.

9. An apparatus as claimed in claim 7 wherein each of said shoe members comprise generally planar upper and lower surface portions, and said apparatus further includes a plurality of steel plates removably coupled to the upper surface of an associated one of said shoe members.

10. An apparatus for forming a workpiece by aligning and butt welding together in an abutting configuration proximal edge portions of first and second sheet blanks, said apparatus including, welding means for welding the proximal edge portion of the first sheet blank to the proximal edge portion of the second sheet blank along a seam line, positioning means for positioning the proximal edge portion of said first sheet blank in a welding position, first sheet supporting means for supporting said first sheet blank with said edge portion of said first sheet blank in said welding position, the first sheet blank supporting means including, magnetic indexing conveyor means for movably supporting said first sheet blank thereon, first clamping means for releasably retaining said first sheet blank in said apparatus during welding, the first clamping means comprising, first magnetic hold-down means for engagingly supporting a first side of said first sheet blank, and first shoe means for engaging the second other side of said first sheet blank, the first shoe means characterized by magnetic susceptibility and being movable relative to said first hold-down means between a forward position, wherein said first shoe means is moved towards said first hold-down means to substantially prevent movement of said first sheet blank therebetween, and a rearward position, wherein said first shoe means is moved away from said first hold-down means to permit substantially unhindered movement of said first sheet blank therebetween, the first clamping means being activatable to produce a magnetic field in the first hold-down means sufficient to magnetically attract the first shoe means to the forward position and clamp the first sheet blank therebetween, and second sheet blank supporting means for supporting said second sheet blank with said proximal edge portion of said second sheet blank in a generally abutting relationship with said proximal edge portion of said first sheet blank.

11. An apparatus as claimed in claim 10 wherein said second sheet supporting means includes second clamping means for releasably retaining said second sheet blank in said apparatus during welding, the second clamping means comprising, second electromagnetic hold-down means for engagingly supporting a first lower side of said second sheet blank, and second shoe means for engaging the other upper side of said second sheet blank, the second shoe means characterized by magnetic susceptibility, and being vertically movable relative to the second hold-down means between a sheet engaging position, wherein the second shoe means is lowered towards the second hold-down means to engage and clamp the second sheet blank between the second shoe means and second hold-down means, and a release position wherein the second shoe means is raised above the second hold-down means a distance selected to permit movement of the second sheet blank therebetween, wherein the second clamping means is activatable to produce a magnetic field in the second hold-down means to magnetically attract the second shoe means and assist in moving the second shoe means to the sheet engaging position to clamp the second sheet blank therebetween.

12. An apparatus as claimed in claim 11 wherein said positioning means including a locating pin having a sheet engaging circumferential portion aligned with said seam line, said pin being vertically movable between a first sheet engaging position, wherein said pin is moved vertically relative to said first supporting means so that the circumferential portion engages the proximal edge portion of said first sheet, and a second lower position wherein said pin is lowered relative to said first sheet to a position wherein the edge portion of the second sheet may be moved into direct engagement with the edge portion of the first sheet.

13. An apparatus as claimed in claim 12 wherein said first and second support means are adjustable vertically relative to each other.

14. An apparatus as claimed in claim 12 wherein said welding means comprises a yttrium aluminum garnet laser having a laser head which is movable along a path substantially aligned with said seam line.

15. Use of an apparatus to form a workpiece by welding together proximal edge portions of first and second sheet blanks, said apparatus including, welding means for welding the proximal edge portion of the first sheet to the proximal edge portion of the second sheet along a seam line, positioning means for positioning the edge portion of said first sheet in a position substantially aligned with said seam line, first sheet supporting means for supporting said first sheet with said edge portion of said first sheet in said position aligned with said seam line, the first sheet supporting means including, first clamping means activatably to releasably retain said first sheet in said apparatus during welding, the first clamping comprising, first electromagnetic hold-down means for engagingly supporting a first side of said first sheet, and first shoe means for engaging the second other side of said first sheet, the first shoe means having magnetic susceptibility and being movable relative to said first hold-down means between a forward clamping position wherein said first shoe means is moved towards said first hold-down means to engage and clamp a portion of said first sheet therebetween, and a rearward position wherein said first shoe means is moved away from said first hold-down means a distance sufficient to permit movement of said first sheet therebetween, and second sheet supporting means for supporting said second sheet thereon with said edge portion of said second sheet in an approximately abutting relationship with said edge portion of said first sheet, said second sheet supporting means including, second clamping means activatable to releasably retain said second sheet in said apparatus during welding, the second clamping means comprising, second electromagnetic hold-down means for engagingly supporting a first side of said second sheet, and second shoe means for engaging the second other side of said second sheet, the second shoe means having magnetic susceptibility and being movable relative to said second hold-down means between a forward clamping position, wherein said second shoe means is moved towards said second hold-down means to engage and clamp a portion of said second sheet therebetween, and a rearward position wherein said second shoe means is moved away from said second hold-down means a distance sufficient to permit movement of said second sheet therebetween, wherein with each of said first and second means positioned in said respective rearward positions, said workpiece is formed by the steps of, moving said first sheet between said first shoe means and said first hold-down means to engage said positioning means and to position said edge portion of said first sheet substantially in alignment with said seam line, activating said first clamping means to product a magnetic field in said first hold-down means and move the first show means to the forward position to retain the first sheet therebetween, moving said second sheet between said first shoe means and said second hold-down means to position the edge portion of the second sheet in a position abutting the edge portion of the first sheet, activating the second clamping means to produce a magnetic field in said second hold-down means and move the second shoe means to the forward position to retain the second sheet therebetween, and activating said welding means to perform welding along the seam line to weld together the edge portion of the first sheet and the edge portion of the second sheet.

16. Use of the apparatus as claimed in claim 15 wherein said positioning means includes a locating pin, the locating pin including a first sheet engaging circumferential position aligned with said seam line, the pin being vertically movable between a first sheet engaging position, wherein said pin is moved vertically relative to said first supporting means so that the circumferential portion engages the proximal edge portion of said first sheet, and a second lower position wherein said pin is lowered relative to said first sheet to a position wherein the edge portion of the second sheet may be moved into direct engagement with the edge portion of the first sheet, and the step of moving said first sheet includes the step of moving the edge portion of the first sheet into abutting contact with the circumferential portion of the locating pin, and immediately preceding the step of moving the second sheet, lowering the locating pin to the second lower position.

17. An apparatus as claimed in claim 5 further including, suction lift means for lifting said first sheet onto said conveyor means, said suction lift means being selectively operable in a high pressure vacuum mode wherein said first sheet is fixedly retained by said lift means, and a reduced pressure vacuum mode wherein said first sheet is slidable retained thereby, and guide means for guiding said first sheet in a desired position on said conveyor means when said lift means is operated in said reduced pressure vacuum mode.

18. Use of the apparatus as claimed in claim 15, wherein said seam line is a predetermined seam line.

19. Use of the apparatus as claimed in claim 15, wherein said welding means comprises a yttrium aluminum garnet laser.

20. An apparatus as claimed in claim 10 further including, suction lift means for lifting said first sheet blank onto said indexing conveyor, said suction lift means being selectively operable in a high pressure vacuum mode wherein said first sheet blank is fixedly retained by said lift means, and a reduced pressure vacuum mode wherein said first sheet is slidable retained thereby, and guide means for guiding said first sheet blank in a desired position on said conveyor when said lift means is operated in said reduced pressure vacuum mode.

* * * * *